(No Model.)

F. H. THOMPSON & G. P. TORMEY.
WEDGING DEVICE FOR TOOL HANDLES.

No. 477,082. Patented June 14, 1892.

WITNESSES:

INVENTORS,
Frank H. Thompson
George P. Tormey
BY
ATTORNEY.

UNITED STATES PATENT OFFICE.

FRANK H. THOMPSON AND GEORGE P. TORMEY, OF PHILADELPHIA, PENNSYLVANIA.

WEDGING DEVICE FOR TOOL-HANDLES.

SPECIFICATION forming part of Letters Patent No. 477,082, dated June 14, 1892.

Application filed July 6, 1891. Serial No. 398,598. (No model.)

*To all whom it may concern:*

Be it known that we, FRANK H. THOMPSON and GEORGE P. TORMEY, citizens of the United States, both residing in the city and county of Philadelphia, State of Pennsylvania, have invented a new and useful Improvement in Wedging Devices for Tool-Handles, which improvement is fully set forth in the following specification and accompanying drawings.

Our invention relates to improvements in wedging devices for tool-handles, and has for its object a device that will efficiently spread the head of the handle of a tool in which it is inserted and at the same time be gripped by the material of the said handle, so as to be securely retained therein; and for this purpose it consists of the combination of parts, as hereinafter set forth.

Figure 1:
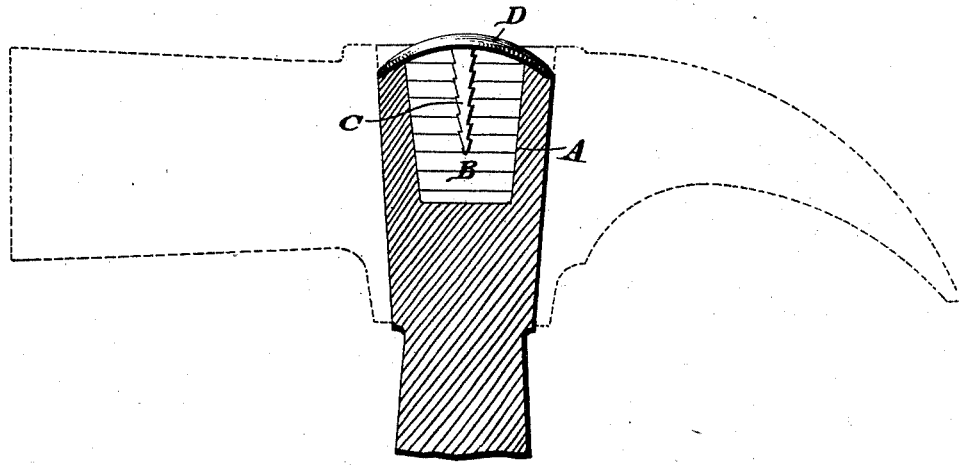
Figure 2:
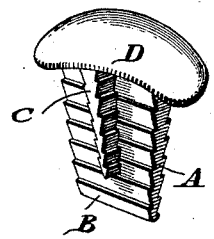
Figure 3:
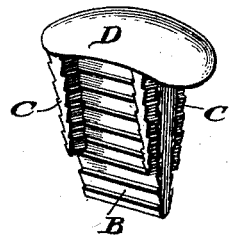

Figure 1 represents a sectional view of a tool-handle, showing a side view of a wedge embodying our invention. Fig. 2 represents a perspective view of the wedge shown in Fig. 1. Fig. 3 represents a perspective view of a modified form thereof.

Similar letters of reference indicate corresponding parts in the several figures.

Referring to the drawings, A designates a wedge having a series of parallel serrations or teeth B on the sides thereof. Connected with and extending from said wedge A on the sides thereof and at an angle thereto and at or about the center thereof are auxiliary wedges C, the same having serrations on the faces, which latter extend at or about a right angle to the serrated faces of the main wedge. The entering edges of the auxiliary wedges C are above the lower or entering edge of the main wedge A, so that the latter first enters the end of the tool-handle.

The tops of the wedges A and C are provided with a head D, adapted to receive the blows of a hammer or other tool for driving them in place.

In Fig. 3 we show two auxiliary wedges C of the faces of the main wedge A, thereby increasing the hold of the device in the handle.

It will be seen that as the device is inserted or driven into the end of a tool-handle it spreads or forces the material of the handle against the wall of the eye in the tool, whereby the end of the handle becomes wedged in the said eye.

Owing to the serrations of the wedges, the liability of the slipping or loosening of the device is lessened.

Having thus described our invention, what we claim as new, and desire to secure by Letters Patent, is—

1. A wedging device consisting of a main wedge and auxiliary wedges projecting from the opposite side thereof and having their entering edges above the entering edge of the main wedge, the faces of said wedges having teeth, substantially as described.

2. A wedging device consisting of a head, a main wedge, and auxiliary wedges connected with opposite sides of the main wedge, said main and auxiliary wedges having teeth on their faces, substantially as described.

3. A wedging device consisting of a head, a main wedge, and auxiliary wedges on opposite sides of the faces of the main wedge, the faces of both wedges having serrations thereon, those of the auxiliary wedges being at a right angle to those on the main wedge, substantially as and for the purpose set forth.

FRANK H. THOMPSON.
GEORGE P. TORMEY.

Witnesses:
JOHN A. WIEDERSHEIM,
A. P. JENNINGS.